UNITED STATES PATENT OFFICE.

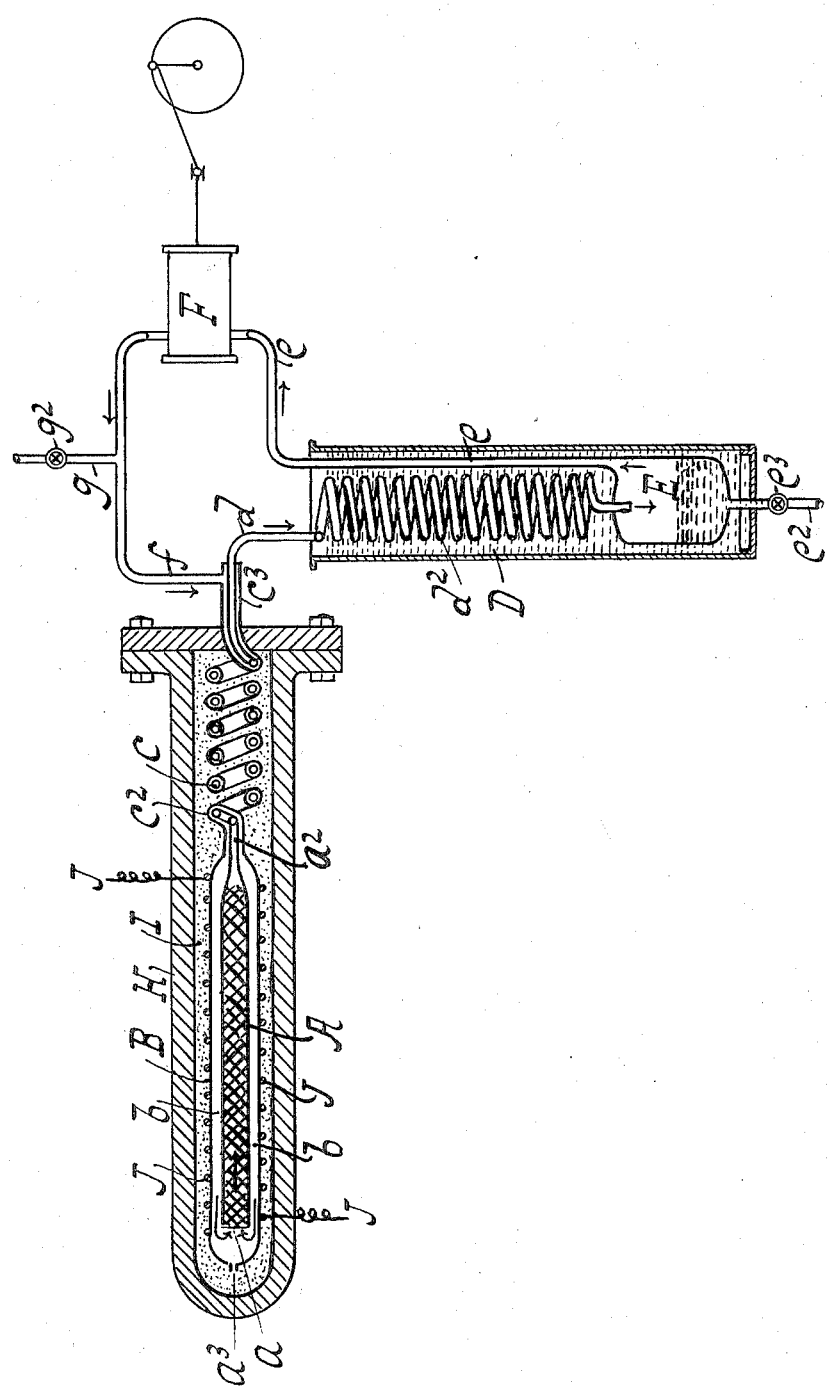

FRITZ HABER AND ROBERT LE ROSSIGNOL, OF KARLSRUHE, GERMANY, ASSIGNORS TO BADISCHE ANILIN & SODA FABRIK, OF LUDWIGSHAFEN-ON-THE-RHINE, GERMANY, A CORPORATION OF BADEN.

PRODUCTION OF AMMONIA.

1,202,995.           Specification of Letters Patent.       Patented Oct. 31, 1916.

Application filed August 13, 1909. Serial No. 512,680.

*To all whom it may concern:*

Be it known that we, FRITZ HABER, Ph. D., professor of chemistry, and ROBERT LE ROSSIGNOL, bachelor of science, subjects, respectively, of the King of Prussia and the King of England, residing at Karlsruhe, Germany, have invented new and useful Improvements in the Production of Ammonia, of which the following is a specification.

Although it is known that on passing a mixture of nitrogen and hydrogen over a catalyst at a raised temperature a small fraction of the gases is converted into ammonia, no method for carrying out this process so as to produce ammonia on a technical scale has hitherto been discovered (see *Zeitschrift für Elektrochemie,* 1907, p. 524). Attempts have been made to increase the quantity of ammonia formed, by withdrawing the ammonia from the gases after they leave the catalyst and then passing the gases thus freed from ammonia again over the cataylst (*Zeitschrift für Anorganische Chemie,* vol. 44, p. 376), but the results obtained have not led to any technical process being discovered. We have now discovered that ammonia can be obtained from its elements in a manner which is capable of commercial existence by passing a mixture of nitrogen and hydrogen, or gases containing them (the proportion being preferably one volume of nitrogen to each three volumes of hydrogen), over a catalytic agent at a high temperature and removing at a lower temperature the ammonia contained in the gases leaving the catalyst. The gases from which ammonia has been removed are then passed over the catalyst again and this may be done by returning the gases to the part of the apparatus containing the catalyst over which they have already passed and so treating them repeatedly with the same quantity of catalyst. Further, the process must be carried out continuously under pressure and the quantity of ammonia removed from the gases may be replaced by an equivalent quantity of nitrogen and hydrogen and at the same time the hot gases leaving the catalyst can be used to preheat the gases from which ammonia has been removed and which are about to be passed over the catalyst. In order to effect this regeneration of heat, a small preheater is sufficient, since when the gases being treated are subjected to pressure the exchange of heat takes place much more rapidly than when the gases are maintained at ordinary pressure. Should this transference of heat from the hotter gases to the cooler gases be insufficient to reduce the temperature of the hotter gases to the degree necessary to enable the ammonia to be conveniently extracted therefrom, additional means of cooling should be employed. The removal of the ammonia from the gases as aforesaid can be effected either by cooling the mixture of gases containing ammonia until the ammonia separates out in a liquid state, or the ammonia can be absorbed by means of any suitable absorbing agent, or these two methods can be combined in such a manner that the first, more easily condensable portion of ammonia is removed by condensation and the remainder is then extracted by means of an absorbing agent. In either case, the removal of the ammonia takes place without the pressure to which the gases are subjected being released. We have further discovered that if the conditions under which the process is being worked are such that a comparatively high concentration of ammonia is obtained in the gases leaving the catalyst (for instance by using a very effective catalyst, such for instance as osmium, or by working at a very high pressure), the advantages obtained from a heat regeneration, such as hereinbefore described, are of relatively less importance, so that the process can be carried out by working under continuous pressure and separating the ammonia from the gases leaving the catalyst in the manner hereinbefore described, without causing heat to pass from the gases leaving the catalyst to those from which ammonia has been removed and which are about to pass over the catalyst.

One method of carrying out the process according to our invention may be as follows: The catalyst is introduced into a metallic tube to the end of which a heat regenerator is attached. The heat regenerator can be of any suitable form, for instance it may consist of a worm tube with a number of narrow coils, or it may consist of a system of such tubes, or it may merely be a number of straight parallel tubes. The gaseous mixture containing nitrogen and hydrogen in suitable proportions enters the other end of the metallic tube, passes over the catalyst, then through the heat regenerator and then through the condenser, absorber, or the like, to a circulating pump. From this pump the gases are returned along the outside of the aforesaid worm or other tubes of the heat regenerator, abstracting heat from the gases contained therein, and they then pass outside the tube containing the catalyst and then into the other end of this tube, over the catalyst again. A branch tube can be employed to admit of the supply of nitrogen and hydrogen to replace the quantity removed in the form of ammonia. The parts of the apparatus to be kept heated are preferably covered with heat-insulating material and the whole apparatus is arranged so that the circulation can take place at a suitable pressure. If desired, the catalyst can be supplied with an amount of heat above that contained in or produced by the system, for instance, electrical heating can be employed. The temperature, at which the catalyst is maintained varies according to the material used and generally lies, say, between 500° and 1000° C. But in employing the expression "high temperature" herein we do not mean to limit ourselves necessarily to a temperature as high as 500° C. The pressure can be varied within wide limits, for instance the process can be carried out at a pressure of 150 atmospheres. If a higher pressure be employed the concentration of the ammonia increases and vice versa. If the liquid ammonia which is obtained according to this example is not used as such, but is converted again into the gaseous form, it is advisable to use the cold produced during its evaporation for the purpose of cooling the gases leaving the catalyst.

When gases, other than simply nitrogen and hydrogen in combining proportions are continuously introduced into the system and the neutral gas or gases accumulate and reach such a concentration that the reaction between the nitrogen and hydrogen is adversely affected, the gases should be let out from the apparatus so that the apparatus can be charged afresh with gases as at the commencement of the operation. We prefer, therefore, always to work with nitrogen and hydrogen as pure as possible and in combining proportions so that the operation need be interrupted as seldom as possible.

The accompanying drawing represents in vertical section an apparatus adapted for carrying out the process of our invention.

A is a tube containing the catalytic substance and open at the end $a$, so as to communicate with the space $b$, between the tube A and the tube B. The end $a^2$ of the tube A communicates with the coil $c$ which is inclosed in an outer coil $c^2$ so as to leave a space between the two coils. The coil $c^2$ constitutes a continuation of the tube D. The coil $c$ is connected by the pipe $d$ with the coil $d^2$ in the cooling vessel D, the said coil $d^2$ terminating in a vessel E for the condensed ammonia, a pipe $e$ passing up from this vessel and being connected to the inlet of a circulating pump F the outlet pipe $f$ from which communicates with the end $c^3$ of the coil $c^2$. The pipe $g$ having a tap $g^2$ is for supplying to the system nitrogen and hydrogen, or gases containing nitrogen and hydrogen. For the reason aforesaid, we prefer to supply pure hydrogen and nitrogen in combining proportions. The supply is, of course, effected at a pressure which will enable the gases to enter against the internal pressure.

The tubes $c$, $c^2$ constitute the aforesaid heat regenerator which, together with the tubes or pipes, A and B, are inclosed in the tube H, the whole being strong enough to withstand the pressure employed, the small opening $a^3$ at the end of the tube A being to prevent the tube A being burst by pressure inside it in excess of pressure outside it. Packing of insulating material is filled in between the tube H and the tube B and coil $c^2$, as shown at I. An electrical resistance wire J is shown wound around the tube B for the purpose of heating the catalytic substance or the gases as they pass to the catalytic substance. The liquid ammonia can be drawn off by the pipe $e^2$ and tap $e^3$.

When using the apparatus just described, the procedure may be as follows: Fill the tube A with finely divided iron and then heat slowly by means of an electric current through the wire J while passing the gaseous mixture of nitrogen and hydrogen through the apparatus. When the temperature has reached about 650° C., increase the pressure in the apparatus to about 150 atmospheres, by pressing the gases in through the valve $g^2$. Then set the circulating pump F in action and apply a suitable cooling agent to the coil $d^2$ in the vessel D. Hereupon the greater part of the ammonia is liquefied and collects in E, while the unchanged gases together with a fresh portion of the gas mixture which has passed into the apparatus through the valve $G^2$ are caused to pass once more through the regenerator $c^2$, and the reaction tube A.

We wish it to be understood that the above is only one method of carrying out our invention, and that the invention is not confined to this method, since it is readily apparent that it can be varied in many ways without departing from the nature of the invention.

Now what we claim is:

1. The process of producing ammonia by passing a gaseous mixture containing nitrogen and hydrogen over a suitable catalytic agent at a high temperature and removing at a lower temperature ammonia contained in the gases leaving the catalyst, and then again passing the gases from which ammonia has been removed over a catalyst at a high temperature while carrying out the process continuously under pressure and replacing the quantity of ammonia removed from the gases by a fresh quantity of free nitrogen and hydrogen.

2. The process of producing ammonia by passing a gaseous mixture containing nitrogen and hydrogen over a suitable catalytic agent at a high temperature and removing at a lower temperature ammonia contained in the gases leaving the catalyst and then again passing the gases from which ammonia has been removed over the catalyst by returning them to the part of the apparatus containing the catalyst already used, while carrying out the process continuously under pressure and replacing the quantity of ammonia removed from the gases by a fresh quantity of free nitrogen and hydrogen.

3. The process of producing ammonia by passing a gaseous mixture containing nitrogen and hydrogen over a suitable catalytic agent at a high temperature and removing at a lower temperature ammonia contained in the gases leaving the catalyst and then again passing the gases from which ammonia has been removed over the catalyst by returning them to the part of the apparatus containing the catalyst already used, while carrying out the process continuously under pressure.

4. The process of producing ammonia by passing a gaseous mixture containing nitrogen and hydrogen over a suitable catalytic agent at a high temperature and removing ammonia at a lower temperature from the gases leaving the catalyst and then again passing the gases over a suitable catalyst while carrying out the process continuously under pressure and maintaining substantial uniformity of pressure during the whole of the operations.

5. The process of producing ammonia by passing a gaseous mixture containing nitrogen and hydrogen over a suitable catalytic agent, removing ammonia from the gases leaving the catalyst while carrying out the process continuously under pressure.

6. The process of producing ammonia by passing a gaseous mixture containing nitrogen and hydrogen over a suitable catalytic agent, removing ammonia from the gases leaving the catalyst, and repeating the operation on the uncombined gases while carrying out the process continuously under pressure.

7. The process of producing ammonia by passing a gaseous mixture containing nitrogen and hydrogen over a suitable catalytic agent, removing ammonia from the gases leaving the catalyst and repeating the operation on the uncombined gases while carrying out the process continuously under pressure and maintaining substantial uniformity of pressure during all the operations.

8. The process of producing ammonia by passing a gaseous mixture containing nitrogen and hydrogen over a suitable catalytic agent, removing ammonia as a base from the gases leaving the catalyst, and repeating the operation, while protecting the catalyst from the introduction of detrimental substances, and while carrying out the process continuously under pressure and maintaining substantial uniformity of pressure during all the operations.

9. The process of producing ammonia by passing a gaseous mixture containing nitrogen and hydrogen over a suitable catalytic agent at a high temperature and removing at a lower temperature ammonia contained in the gases leaving the catalyst and then passing the gases from which ammonia has been removed over the catalyst, while carrying out the process continuously under pressure and replacing the quantity of ammonia removed from the gases by a fresh quantity of free nitrogen and hydrogen and at the same time causing the hot gases leaving the catalyst to preheat the cooler gases from which ammonia has been removed and which are about to be passed over the catalyst.

10. The process of producing ammonia by passing a gaseous mixture containing nitrogen and hydrogen over a suitable catalytic agent at a high temperature and removing at a lower temperature ammonia contained in the gases leaving the catalyst and then passing the gases from which ammonia has been removed over the catalyst, while carrying out the process continuously at a pressure exceeding that of one hundred atmospheres and replacing the quantity of ammonia removed from the gases by a fresh quantity of free nitrogen and hydrogen.

11. The process of producing ammonia by passing a gaseous mixture containing nitrogen and hydrogen over a suitable catalytic agent at a high temperature and removing at a lower temperature ammonia contained in the gases leaving the catalyst and then passing the gases from which ammonia has been removed over the catalyst, while carrying out the process continuously at a pressure exceeding that of one hundred atmospheres and replacing the quantity of ammonia removed from the gases by a fresh quantity of free nitrogen and hydrogen, and at the same time causing the hot gases leaving the catalyst to preheat the cooler gases from which ammonia has been removed and which are about to be passed over the catalyst.

12. The process of producing ammonia by passing a gaseous mixture containing nitrogen and hydrogen over a suitable catalytic agent at a high temperature and removing in a liquid state and at a lower temperature ammonia contained in the gases leaving the catalyst, then passing the gases from which ammonia has been removed over the catalyst, while carrying out the process under continuous pressure, and replacing the quantity of ammonia removed from the gases by a fresh quantity of free nitrogen and hydrogen.

13. The process of producing ammonia by passing the gaseous mixtures of nitrogen and hydrogen around a catalyst at a high temperature and into a suitable condenser at a lower temperature and removing ammonia therefrom and then adding to the gaseous mixture from which ammonia has been extracted a new supply of nitrogen and hydrogen, the whole of the operations being conducted continuously under pressure.

14. The process of obtaining ammonia by passing a gaseous mixture containing nitrogen and hydrogen under pressure continuously around and over a catalyst at a high temperature and then cooling said mixture and extracting ammonia therefrom and adding to the gases which remain after the extraction of ammonia new nitrogen and hydrogen to an amount equivalent to the ammonia removed, the whole of the operations being conducted continuously without release of the pressure.

15. The process of producing ammonia by passing a gaseous mixture containing nitrogen and hydrogen in desired proportions continuously under pressure over and around a catalytic substance and forcing new nitrogen and hydrogen under pressure into the mixture in a quantity equivalent to the diminution caused by the drawing off of the ammonia.

In testimony whereof we have hereunto set our hands in the presence of two subscribing witnesses.

FRITZ HABER.
ROBERT LE ROSSIGNOL.

Witnesses:
J. ALEC. LLOYD,
A. RENSLINGER.